United States Patent
Yeo et al.

(10) Patent No.: US 8,934,949 B2
(45) Date of Patent: Jan. 13, 2015

(54) MOBILE TERMINAL

(71) Applicant: LG Electronics Inc., Seoul (KR)

(72) Inventors: Byungsang Yeo, Seoul (KR); Mijin Cho, Seoul (KR); Shinhae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/897,734

(22) Filed: May 20, 2013

(65) Prior Publication Data

US 2014/0141841 A1 May 22, 2014

(30) Foreign Application Priority Data

Nov. 22, 2012 (KR) .................. 10-2012-0133073

(51) Int. Cl.
*H04B 1/38* (2006.01)
*H04M 1/02* (2006.01)

(52) U.S. Cl.
CPC ........ *H04M 1/0202* (2013.01); *H04M 2250/12* (2013.01)

USPC ....... 455/575.1; 455/566; 455/90.3; 455/347; 455/575.3; 455/575.4

(58) Field of Classification Search
CPC .. H04M 1/0208; H04M 1/021; H04M 1/0202
USPC ........ 455/566, 575.1, 90.3, 347, 575.3, 575.4
See application file for complete search history.

(56) References Cited

U.S. PATENT DOCUMENTS

| | | | |
|---|---|---|---|
| 2009/0253468 A1* | 10/2009 | Oberstelehn et al. | 455/570 |
| 2009/0265627 A1* | 10/2009 | Kim et al. | 715/702 |
| 2010/0013651 A1* | 1/2010 | Spalink | 340/669 |

* cited by examiner

*Primary Examiner* — Tuan Pham
(74) *Attorney, Agent, or Firm* — Birch, Stewart, Kolasch & Birch, LLP

(57) ABSTRACT

A mobile terminal including a case having a curved back side between first and second end portions such that when the mobile terminal is placed on a flat surface, a portion of the curved back side touches the flat surface and the first and second end portions are raised above the flat surface; a display unit arranged on a front side of the case; a sensor configured to detect a moving or tilting of the mobile terminal; and a controller configured to perform a designated function in accordance with the moving or tilting of the mobile terminal.

19 Claims, 29 Drawing Sheets

131a 131b 131c 131d 131a 131b 131c 131d

MOBILE TERMINAL

Pursuant to 35 U.S.C. §119(a), this application claims the benefit of earlier filing date and right of priority to Korean Application No. 10-2012-0133073, filed on Nov. 22, 2012, the contents of which are hereby incorporated by reference herein in its entirety.

BACKGROUND OF THE DISCLOSURE

1. Field of the Disclosure

The present invention relates to a mobile terminal controlling an image output on a display unit and a function thereof by tilting or moving the mobile terminal.

2. Discussion of the Related Art

Generally, terminals can be classified into mobile terminals and stationary terminals. In addition, the mobile terminals can be further classified into handheld terminals and vehicle mount terminals.

Further, a mobile terminal can perform various functions such as data and voice communications, capturing images and video via a camera, recording audio, playing music files and outputting music via a speaker system, and displaying images and video on a display. However, the mobile terminal is small in size and thus it is cumbersome to operate the several different functions on the mobile terminal.

SUMMARY OF THE DISCLOSURE

Accordingly, one aspect of the present invention is to provide a mobile terminal that substantially obviates one or more problems due to limitations and disadvantages of the related art.

Another aspect of the present invention is to provide a mobile terminal having a curved surface, which can control an image output on a display thereof and functions thereof by recognizing a tilt as an input signal.

To achieve these objects and other advantages and in accordance with the purpose of the invention, as embodied and broadly described herein, the present invention provides a mobile terminal including a case having a curved back side between first and second end portions such that when the mobile terminal is placed on a flat surface, a portion of the curved back side touches the flat surface and the first and second end portions are raised above the flat surface; a display unit arranged on a front side of the case; a sensor configured to detect a moving or tilting of the mobile terminal; and a controller configured to perform a designated function in accordance with the moving or tilting of the mobile terminal.

In another aspect, the present invention provides a method of controlling a mobile terminal, and which includes detecting, via a sensor, a moving or tilting of the mobile terminal, said mobile terminal including a case having a curved back side between first and second end portions such that when the mobile terminal is placed on a flat surface, a portion of the curved back side touches the flat surface and the first and second end portions are raised above the flat surface, and a display unit arranged on a front side of the case; and performing, via a controller, a designated function in accordance with the moving or tilting of the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, embodiments of the present invention are applicable to such a fixed terminal as a digital TV, a desktop computer and the like as well as a mobile terminal.

Figure 1:
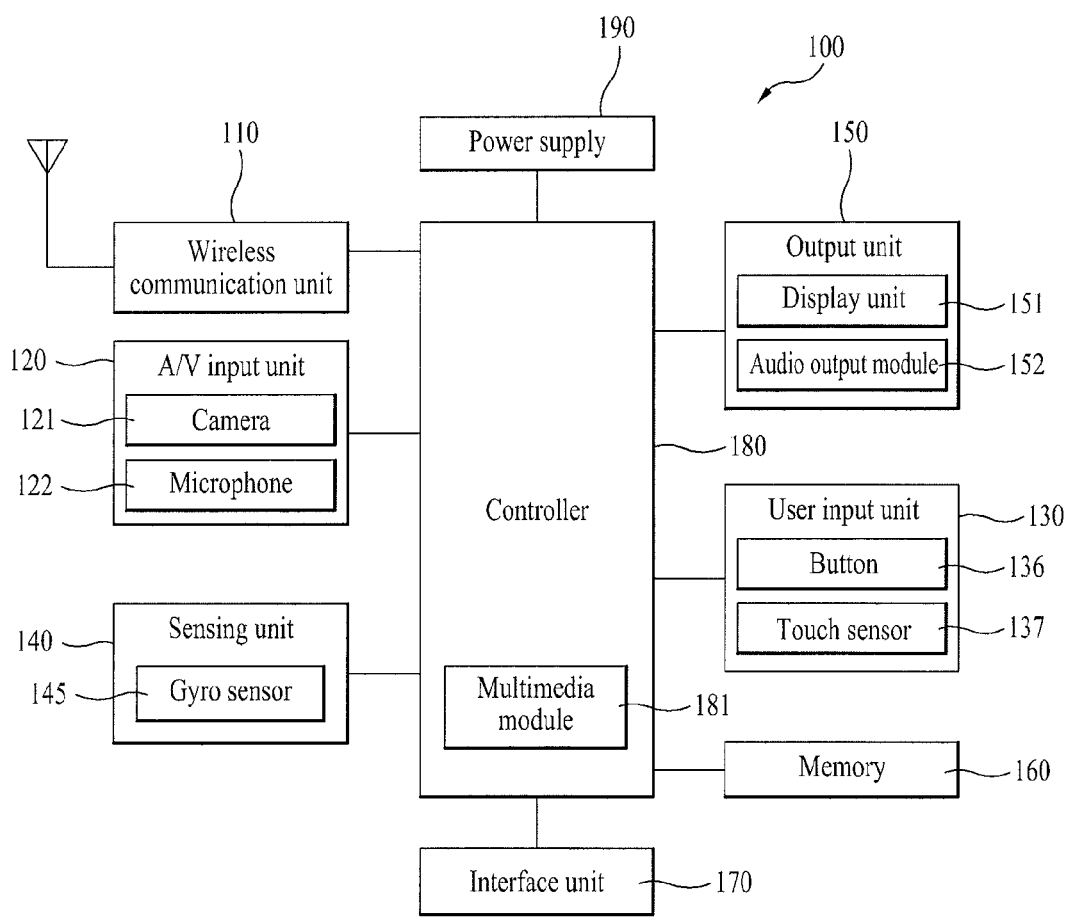
FIG. 1 is a block diagram of a mobile terminal according to one embodiment of the present invention.

FIG. 1 is a block diagram of a mobile terminal 100 in accordance with an embodiment of the present invention. As shown, the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In addition, the wireless communication unit 110 includes one or more components which permits wireless communication between the mobile terminal 100 and a wireless communication system or network within which the mobile terminal 100 is located. For instance, the wireless communication unit 110 can include a broadcast receiving module, a mobile communication module, a wireless internet module, a short-range communication module, a position-location module and the like.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. In a non-limiting example, such sensing unit 140 includes a sensor 145, which can include a gyro sensor, accelerate sensor, geomagnetic sensor, etc.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor.

The output unit 150 generates outputs relevant to the senses of sight, hearing, touch and the like. And, the output unit 150 includes the display unit 151 and an audio output module 152.

The display unit 151 is generally implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display unit 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and the touch sensor 137 configure a mutual layer structure (hereinafter called 'touch screen'), the display unit 151 can be used as an input device as well as an output device. In this instance, the touch sensor can be configured as a touch film, a touch sheet, a touchpad or the like.

The touch sensor 137 can be configured to convert a pressure applied to a specific portion of the display unit 151 or a variation of a capacitance generated from a specific portion of the display unit 151 to an electric input signal. Moreover, the touch sensor 137 can detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

Figure 2A:
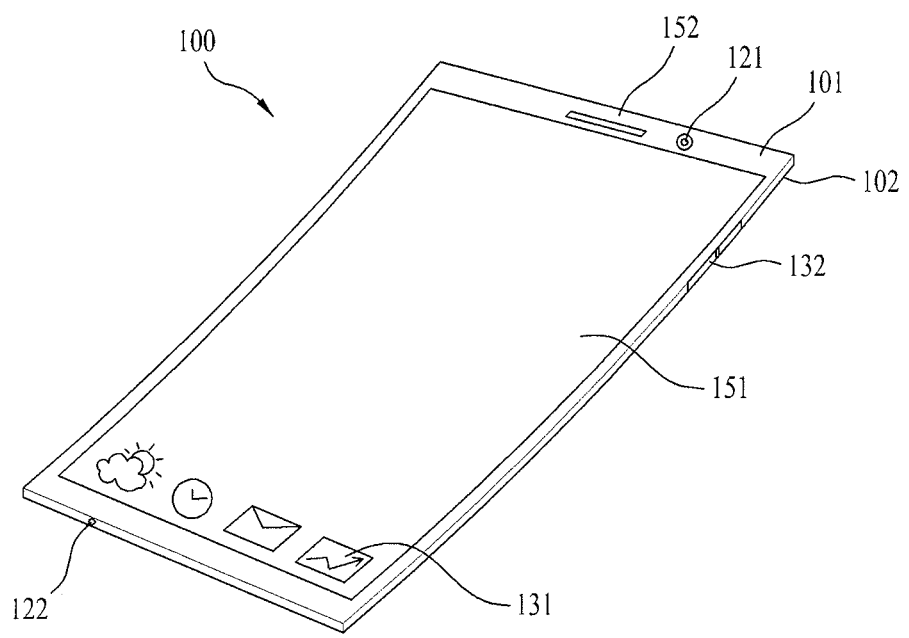
FIGS. 2A to 2E are front perspective diagrams illustrating a mobile terminal according to one embodiment of the present invention.

Next, FIG. 2A is a perspective diagram of a front side of a mobile terminal 100 according to one embodiment of the present invention. The mobile terminal 100 described herewith includes a back side having a predetermined curvature. Specifically, a predetermined portion and the other opposite portion of the back side are projected forward and a center portion thereof is projected backward. The front side and the back side need not have the same curvature. Optionally, the curvature of the front side may be gentler than that of the back side or the front side may be more plane-like than the back side. The curvature of the front and back sides may also be the same.

Figure 3A:
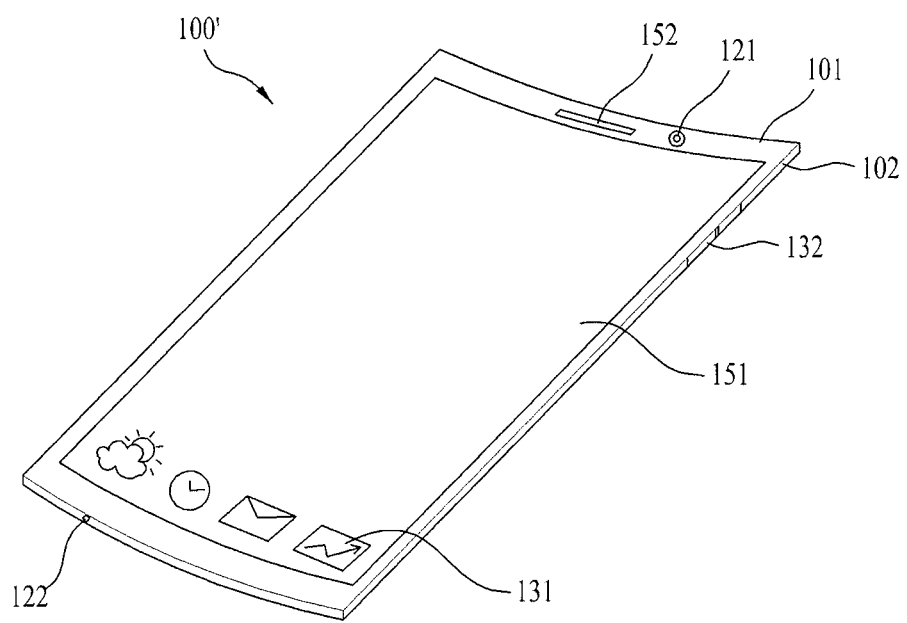
FIGS. 3A to 3E are front perspective diagrams illustrating types of tilt of a mobile terminal according to another embodiment to generate an input signal.

Thus, when the mobile terminal 100 is placed on a surface, the center portion of the back side of the mobile terminal 100 is in contact with the surface and the predetermined portion and the other opposite portion are spaced apart from the surface. In the drawing, the predetermined portion and the other opposite portion are shown as lower and upper ends of the mobile terminal 100. However, the present invention may include right and left portions of the mobile terminal that are curved forward as shown in FIG. 3A.

The body of the mobile terminal 100 includes the cases 101 and 102. In this embodiment, the cases 101 and 102 are a front case 101 and a rear case 102. Various electronic components are mounted in a predetermined space formed between the front case 101 and the rear case 102.

In some instances, electronic components may be mounted on a surface of the rear case 102. Such electronic components mounted on the surface of the rear case 102 may include a battery, an USIM card and a memory card that are detachable by the user. At this time, the rear case 102 may further include a back cover to cover the surface. The back cover may be formed in a detachable structure for the user's easy attaching and detaching. When the user detaches the back cover, the surface of the rear case 102 is exposed.

As shown, the cases 101 and 102 include a display unit 151, an audio output unit 152, a camera 121, a user input unit 131, and 132 and a microphone 122. The display unit 151 occupies most of a main surface of the front case. In addition, the audio output unit 152 and the camera 121 are arranged adjacent to one end of the display unit 151 and the user input unit 132 that is a touch input type and the microphone 122 are arranged adjacent to the other end of the display unit 151. A button type user input unit 132 composing the user input unit and other predetermined units may be arranged in lateral sides of the front and rear cases 101 and 102.

The user input unit 131 arranged on the front side may be configured as a part of the display unit 151 or as an independent part from the display unit 151. The display unit 151 may include a touch sensor 137 (FIG. 1) and receive a user's touch type command. Thus, the user can select a touch type detecting a user input via the touch sensor 137 or a button type applying a physical pressure.

Next, FIGS. 2B to 2E are front perspective diagrams illustrating a tilting operation of the mobile terminal 100 to generate an input signal of the mobile terminal 100 according to one embodiment of the present invention. In this embodiment, the predetermined portion mentioned above is a lower end of the mobile terminal 100 and the other opposite portion mentioned above is an upper end of the mobile terminal 100.

Figure 2B:
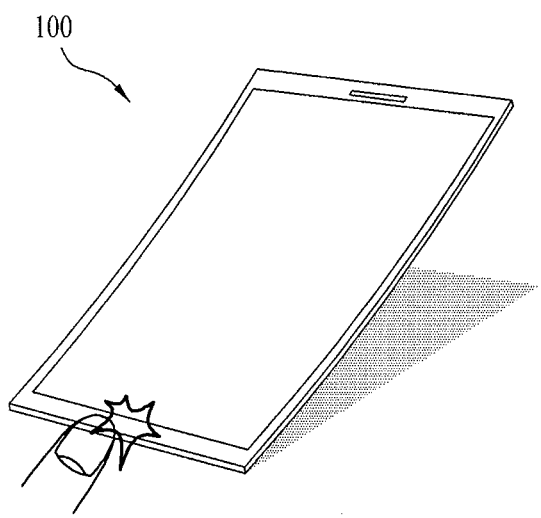

As shown in FIG. 2B, a tilting angle of the mobile terminal 100 is changed when the lower end of the mobile terminal 100 is pressed by the user. Further, the sensor 145 detects the change of the tilting angle and the controller 180 recognizes the change of the tilting angle transmitted from the sensor 145 as an input signal. The input signal recognized from the tilting of the mobile terminal case may be categorized into different touch types.

Figure 2C:
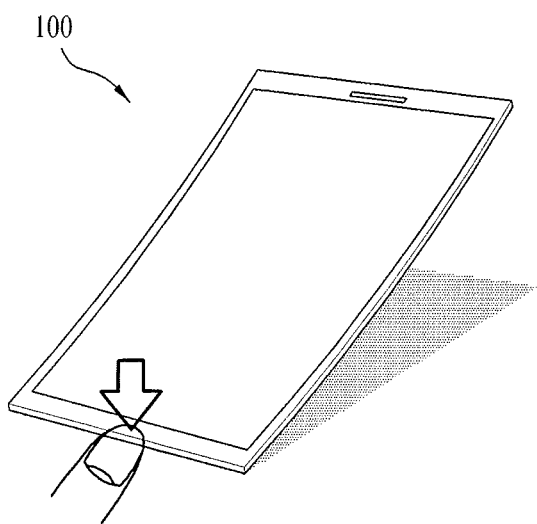

The controller 180 recognizes an input signal generated when the user changes, moves or tilts the mobile terminal. Examples of changing, moving or tilting the mobile terminal include tilting the mobile terminal for a relatively short time by slightly pressing the lower end for a time less than a reference time period as shown in FIG. 2B. Another example includes the user maintaining the tilting of the mobile terminal 100 by pressing the lower end of the mobile terminal 100 for the reference time period or more as shown in FIG. 2C. The reference time period is configured as a standard to distinguish the short touch and the longer maintained touch from each other. The reference time period can be variable according to setting (for example, a substantially short time such as one second).

Figure 2D:
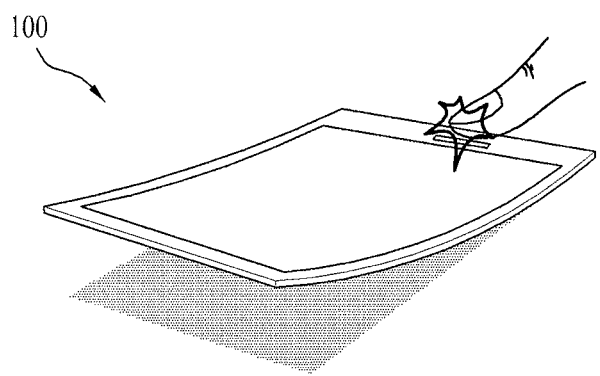
Figure 2E:
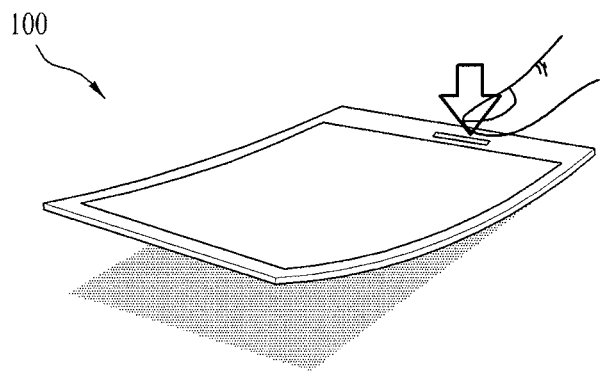

Another example in FIG. 2D shows an input signal can be generated when the user presses the other end for a time period less than the reference time period, in other words, by touching the other end. In still another example, as shown in FIG. 2E, an input signal can be generated when the user maintains the tilting of the mobile terminal 100 for the reference time period or more by pressing the other end, in other words, pressing or pushing the other end.

FIGS. 2B to 2E illustrate the user pressing the lower end or upper end for a short time (less than a predetermined time) and for a longer time (equal to or more than the predetermined time). However, the present invention applies to a tapping of the lower end or upper end. The amount of tilt can also be used as input signals. For example, if the user presses the lower end more firmly so the titling angle is equal to or greater than a predetermined angle, one operation may be performed (e.g., a full page scrolling operation). If the user presses the lower end less firmly so the titling angle is lower than a predetermined angle, another operation may be performed (e.g., a line by line page scrolling operation).

Thus, the way or method (touching, tapping, pressing, pushing, etc.) are used to control the mobile terminal 100. The amount of tilt or number of times the mobile terminal 100 rocks back and forth can be used to control the mobile terminal. For example, the user could turn off the mobile terminal by pressing the lower end of the terminal 100, and then letting the mobile terminal 100 rock back and forth for three or more times. At the third time, the controller 180 can power off or place the mobile terminal 100 into a standby mode. A rebooting operation may be performed by rocking the mobile terminal 100 twice and then pressing the lower end.

Other combination of inputs are also possible with the newly defined curved surface. Thus, the user is given greater amounts of input operations that he or she can use to control the mobile terminal 100. The pressing of one end of the mobile terminal 100 for a short time or less than the predetermined time may be referred to a touching the mobile terminal 100, and the pressing of the end of the mobile terminal 100 for a longer time may be referred to as a pushing of the mobile terminal 100.

In addition, the curved surface prevents the display unit 151 from directly touching a surface. Thus, the display unit 151 will be less likely to break, and also remains cleaner. Because the user can control the mobile terminal 100 by pressing the different ends of the terminal 100, the display unit 151 will be less smudgy from the user continuously touching the display. The curved surface also fits better in the user's hand, especially when the place the mobile terminal 100 near their ear.

Figure 3B:
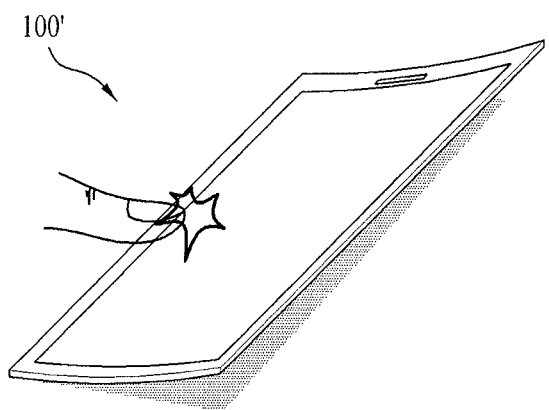
Figure 3C:
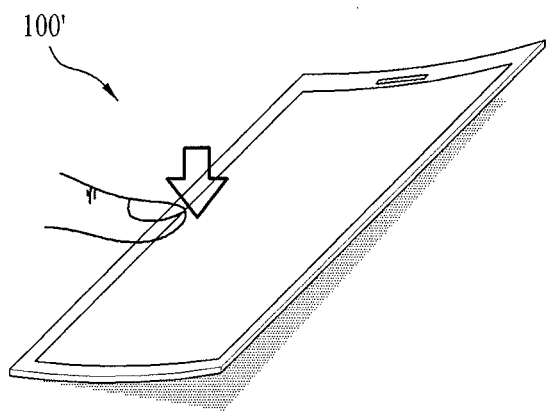
Figure 3D:
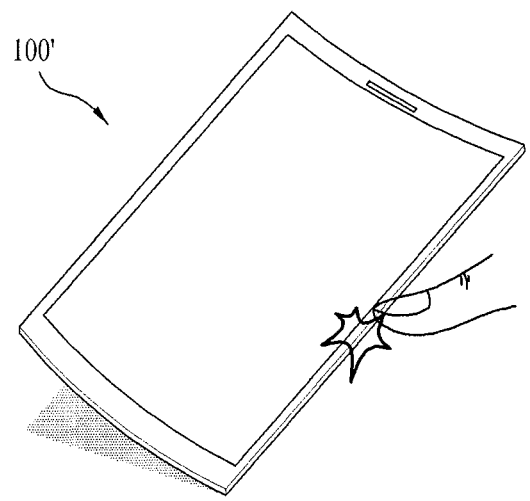
Figure 3E:
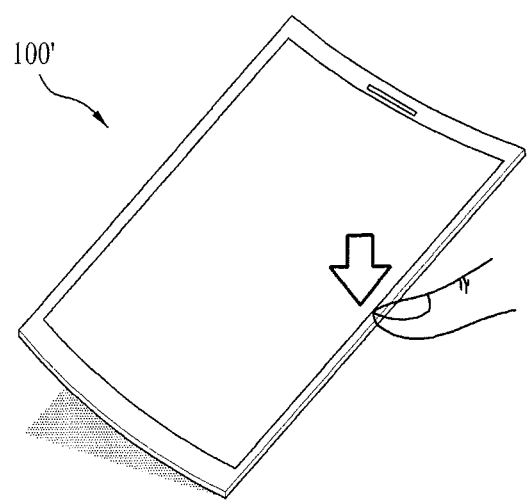

In the mobile terminal curved in a right and left direction according to the embodiment as shown in FIG. 3A, different input signals can be generated when the side end of the mobile terminal is touched as shown in FIG. 3B (e.g., pressed for a short amount of time), when the end is pushed as shown in FIG. 3C (e.g., pressed for a longer amount of time), when the other end of the mobile terminal is touched as shown in FIG. 3D (e.g., pressed for a short amount of time), and when the other end is pushed as shown in FIG. 3E (e.g., pressed for a longer amount of time). This embodiment also applies to the other side end (e.g., right side) of the mobile terminal 100.

The controller 180 implements a function corresponding to the input signal or controls a screen output on the display unit 151. According to one embodiment of the present invention, when the end is pressed while the mobile terminal 100 is placed on a table, the tilting of the mobile terminal is changed by using the curved side of the mobile terminal 100, such that the user can easily operate the mobile terminal 100 without inconvenient complex input or operations.

Figure 4A:
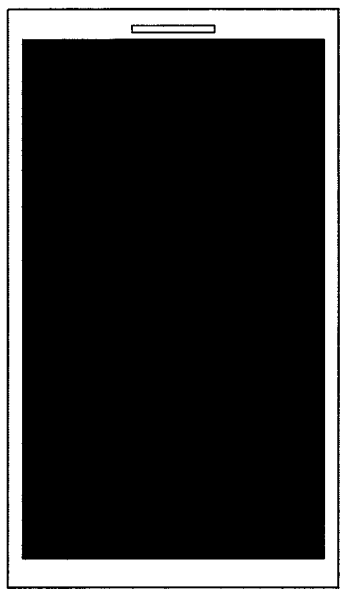
FIGS. 4A to 4D are diagrams illustrating a display screen according to a first embodiment for controlling a mobile terminal.

Next, controlling the display unit 151 according to each input signal will be described. In particular, FIGS. 4A to 4D are diagrams illustrating screens of the display unit 151 according to a first embodiment of the present invention. In particular, FIG. 4A shows the display unit 151 can be in a screen-off locked state or in an unlocked state.

When acquiring only specific information (for example, the time, the weather and the like) in the screen-off state, activating entire functions or switching on an entire screen of the display unit 151 can be eliminated. In this instance, as discussed previously, the user can press a predetermined end portion to generate an input signal. Once the input signal is generated, the display unit 151 outputs a specific information displaying screen 1511 providing information on the display unit 151 while the user presses the mobile terminal 100 as shown in FIG. 4B.

Figure 4B:
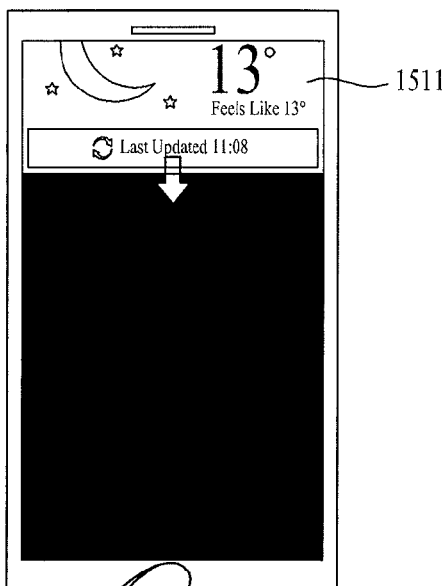
Figure 4C:
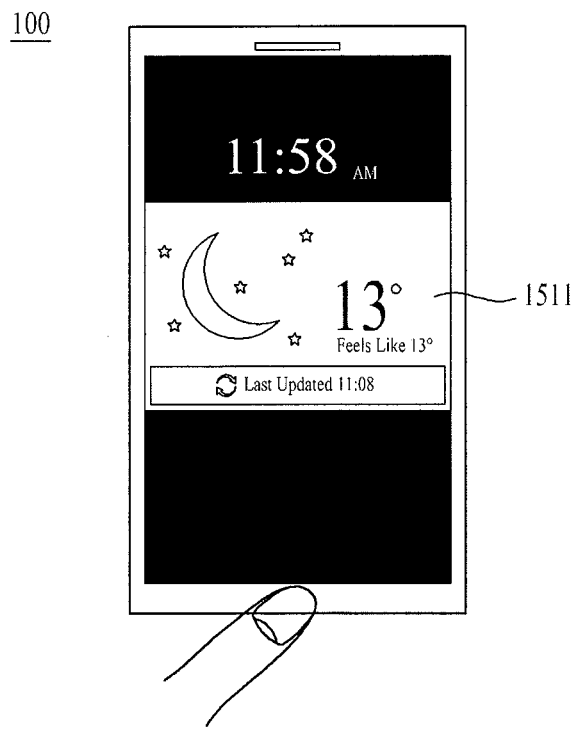

At this time, to gain a more intuitive visual effect according to the tilting, the controller 180 can move the specific information displaying screen 1511 according to a tilted direction of the mobile terminal 100 as shown in FIGS. 4B and 4C. The controller 180 can then stop the specific information displaying screen 1511 at the center portion of the display unit 150 as shown in FIG. 4C.

As shown in FIGS. 4B and 4C, the specific information displaying screen 1511 may include stock information, weather information, schedule information, missed calls, new messages and a notice system, as well as weather information and time information. The specific information displaying screen 1511 can also include features set by the user.

Figure 4D:
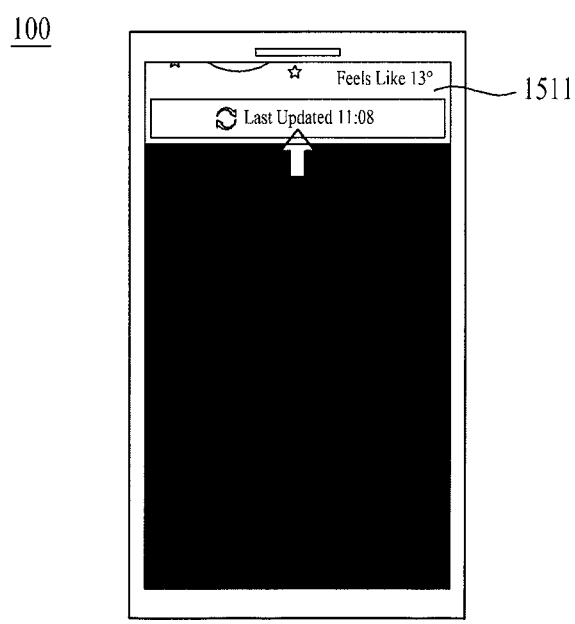

When no input signal is detected after the user stops pressing the end, the controller 180 can make the specific information displaying screen 1511 disappear. For example, the controller 180 can make the specific information displaying screen 1511 disappear by returning the screen 1511 to the opposite side again as shown in FIG. 4D. In this embodiment, the portion pressed by the user is the lower end portion. If the user presses the upper end portion, the controller 180 can display and move the specific information displaying screen 1511 from a downward direction to an upward direction.

Next, FIGS. 5A to 5F are front perspective diagrams of a mobile terminal 100 according to a second embodiment of the present invention. The embodiment shown in FIGS. 5A to 5F is similar to the first embodiment mentioned above in that specific information displaying screens 1511a and 1511b are output on the screen in a screen-off state.

However, in this embodiment, a user input unit 131 (hereinafter, 'input key') positioned on the lower end can be used to set one or more gadgets on specific information displaying screen 1511a and 1511b. In other words, the signal generated by pressing the input key 131 is used in controlling the mobile terminal 100 in addition to the input signal generated according to the moving or tilting of the mobile terminal 100.

As mentioned above, the input key 131 may be configured as the touch sensor of the display unit 151 or one of touch or button types auxiliary arranged in one end of the display unit 151. When the input key 131 is provided independently, an auxiliary display unit or e-ink may be used and the input key 131 may be variable according to the user's setting or event generation.

In this second embodiment, once the input signal is detected via at least one input key 131 being selected and the mobile terminal 100 tilted, a specific information displaying screen 1511a and 1511b corresponding to the selected input key 131 is output on the screen of the display unit 151. FIG. 5 shows the specific information displaying screens 1511a and 1511b moving along a direction from the upper end to the lower end based on the tilting of the mobile terminal 100.

Figure 5A:
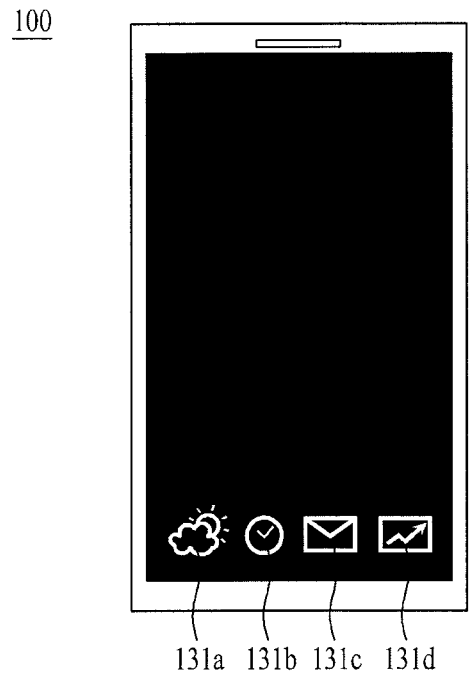
FIGS. 5A to 5F are diagrams illustrating a display screen according to a second embodiment for controlling a mobile terminal.
Figure 5B:
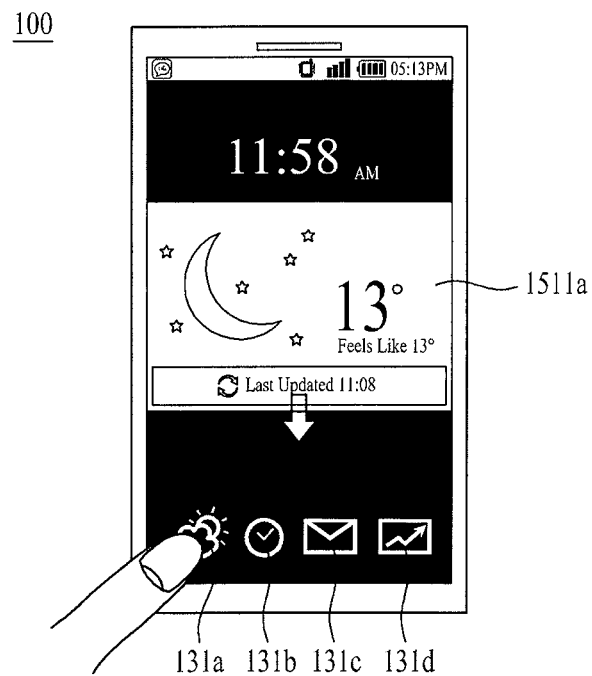
Figure 5C:
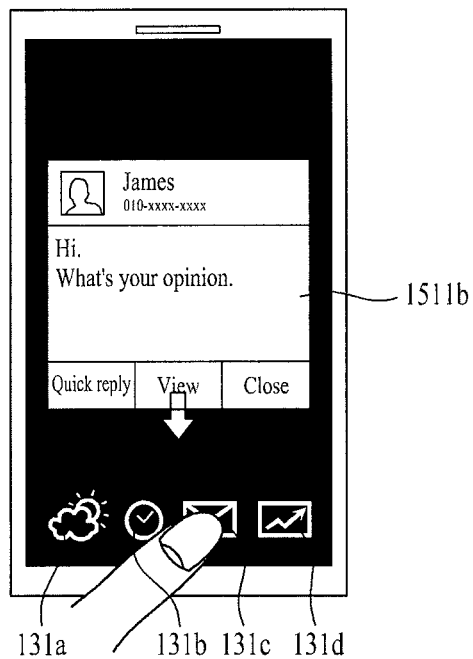

The specific information displaying screen 1511a and 1511b may be differentiated according to each of the buttons and the specific information displaying screen may include the time, the weather, a received message, a missed call, a notice system and a current schedule. As shown in FIG. 5B, when the user presses the lower end while pressing a first button (e.g., weather icon 131a), the controller 180 displays a specific information displaying screen 1511a including the weather information to allow the user to check the weather information. As shown in FIG. 5C, when the user presses the lower end while pressing a message button 131c, the controller 180 displays a specific information displaying screen 1511b indicating a new received message. The user can also select a stock indicator button or icon 131d to view stock information in a similar manner. Time information may also be used by selecting the time or clock button or icon 131b.

The function associated with the input key 131 may include a specific function, rather than the displaying the specific displaying screen 1511. For example, a specific function includes displaying an unlocking screen or switching a current mode into an etiquette mode.

Figure 5D:
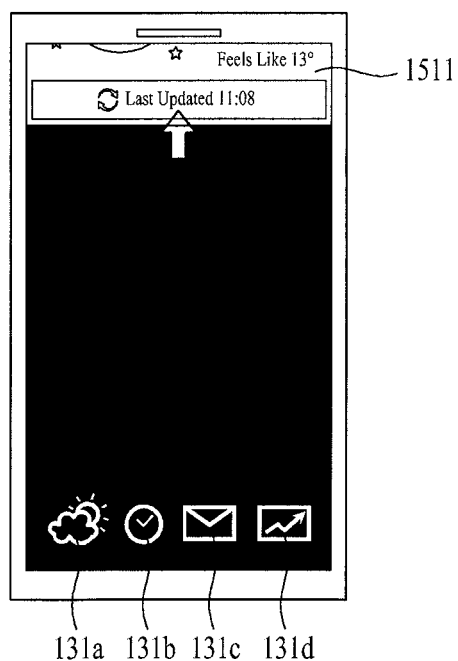

As shown in FIG. 5D, when the user stops pressing the lower end, the controller 180 fades out or moves the specific information displaying screen 1511a and 1511b to disappear from being displayed. Once the specific information displaying screens 1511a and 1511b disappear, the screen of the mobile terminal returns to the screen state shown in FIG. 5A or to a screen-off state.

Figure 5E:
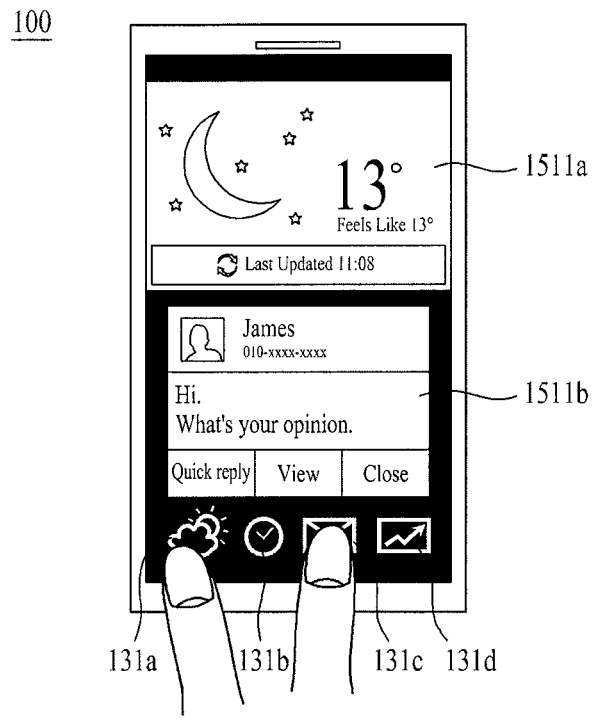

As shown in FIG. 5E, the specific information displaying screens 1511a and 1511b can be simultaneously output by pressing two or more keys and tilting the mobile terminal 100. In the drawings, when the user pressing two input keys simultaneously, the specific information displaying screen 1511a associated with a message and the specific information display screen 1511b associated with the weather are displayed on the screen simultaneously.

The two specific information displaying screens 1511a and 1511b may be output vertically or horizontally and a method of displaying them on the screen may be set differently. For example, one specific information displaying screen 1511a is output from the predetermined portion and the other one is output from the other opposite portion. Optionally, the specific information displaying screens 1511a and 1511b are output on the screen as they are gradually getting brighter. When the input key 131 includes a part of the display unit or an auxiliary touch input key configured to display an auxiliary screen, the input key 131 may be variable in various types.

Figure 5F:
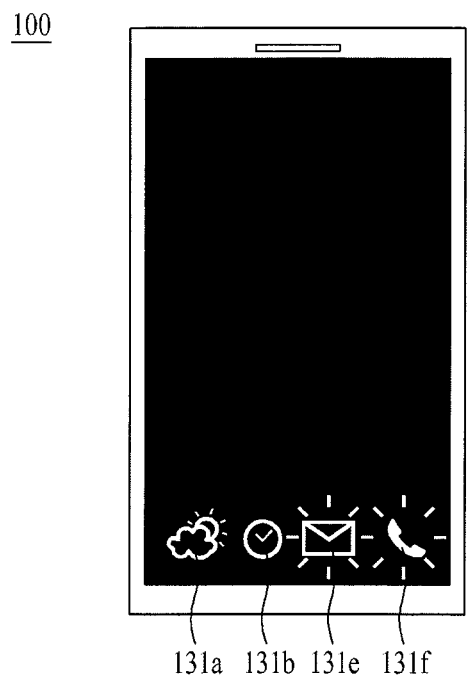

In addition, as shown in FIG. 5F, the brightness or sizes of two input keys 131e and 131f arranged in a lower right portion of FIG. 5F can be changed or highlighted to indicate an event generation to the user. When such variation is set, an alarm and the like can also be output. Thus, when a new message or a missed call is received, a message input key 131e or a call input key 131f is appropriately changed. In addition, as shown in FIG. 5F, when the mobile terminal has a missed call, a call input key 131f can replace an input key not used that much.

Figure 6A:
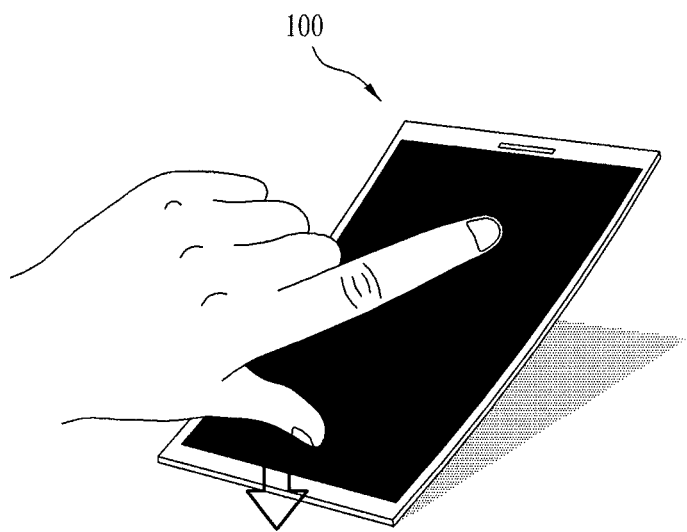
FIGS. 6A to 6F are diagrams illustrating a display screen according to a third embodiment for controlling a mobile terminal.
Figure 6B:
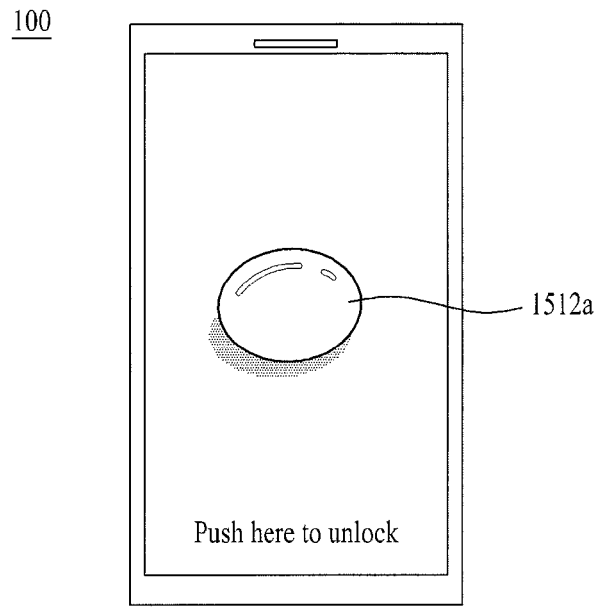

Next, FIGS. 6A to 6E are front perspective diagrams of a mobile terminal 100 according to a third embodiment of the present invention. As shown in FIG. 6A, when an input signal by touching or pushing one end and multi-touching of the display unit (touching two points of the display unit 151 using two fingers) are simultaneously detected, the controller 180 displays a screen for unlocking the screen on the display unit as shown in FIG. 6B.

Figure 6C:
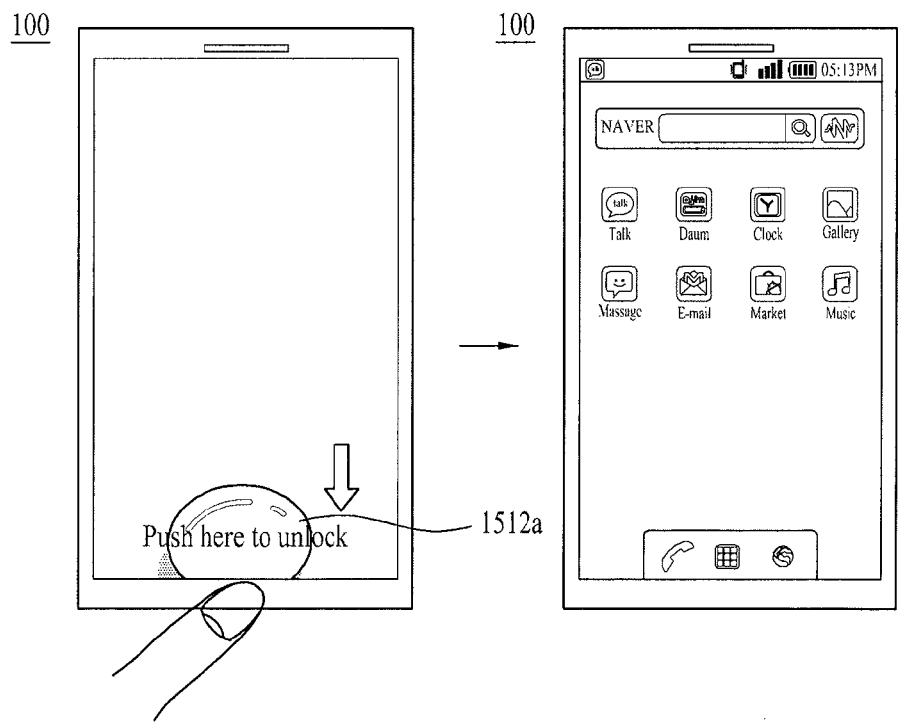
Figure 6D:
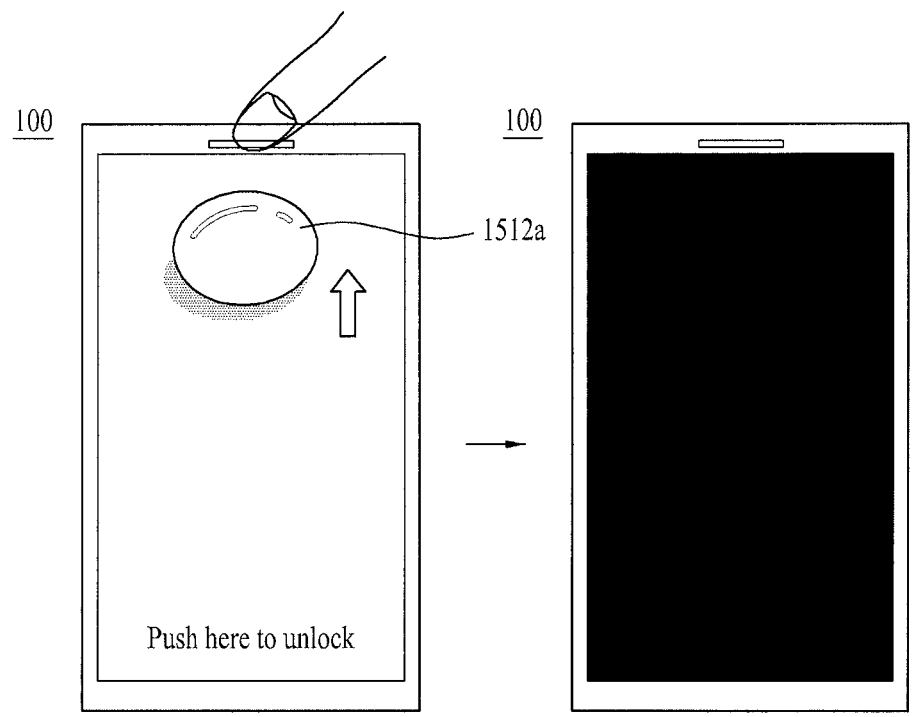

In this embodiment, the unlocking is implemented by detecting a tilting variation of the mobile terminal 100. As shown, a moving object 1512a is displayed on a center of the display unit 151. When the user presses the lowed end of the mobile terminal 100 as shown in FIG. 6C, the controller moves the moving object 1512a in a predetermined direction. When the presses the upper end of the mobile terminal 100, the moving object 1512a is moved in the opposite direction as shown in FIG. 6D.

In this embodiment, the moving object 1512a is a water drop 1512a and the water drop 1512a moves along a tilted direction. The moving object 1512a is not limited to the water drop and may be ball-shaped or simply bar-shaped. When the user presses the end of the mobile terminal 100 and moves the object 1512s off the screen, the mobile terminal 100 is unlocked as shown in FIG. 6C.

Figure 6E:
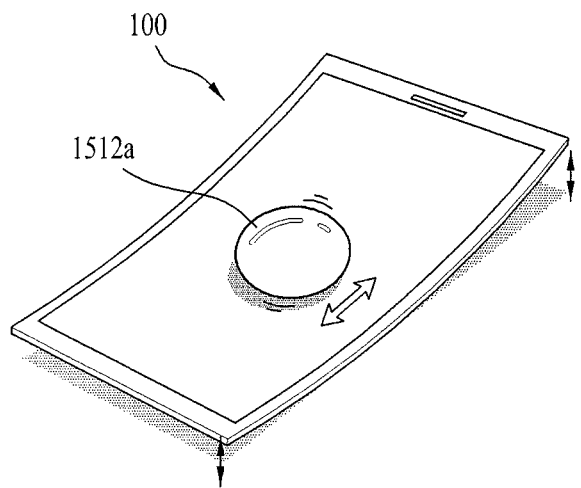

The mobile terminal 100 can also be shaken in a predetermined direction and the moving object can be shaken together with the mobile terminal 100 (see FIG. 6E). Further, when the moving object is the water drop 1512a, the shaking of the terminal makes the display appear as shaking of liquid.

As shown in FIG. 6C, when the user continuously presses the lower end of the mobile terminal 100, the water drop 1512a moves to the lower end and a locked state of the mobile terminal 100 is released. On the contrary, as shown in FIG. 6D, when presses the upper end of the mobile terminal 100, the water drop moves in the other opposite direction to reach the other end and the screen is switched back into the screen-off state.

In addition, the moving speed of the water drop 1512a can be set to be differentiated according to a tilting angle of the mobile terminal 100. In other words, when the tilting of the mobile terminal 100 is steep, the moving speed of the water drop 1512a is fast. When the tilting is gentle, the moving speed is slow.

Figure 6F:
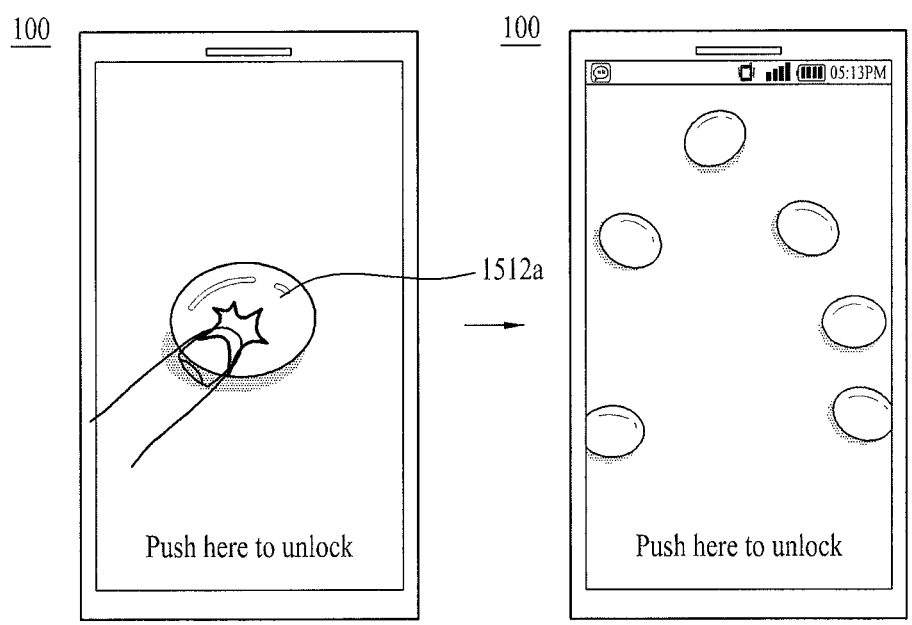

Further, when the water drop 1512a is touched as shown in FIG. 6F, the controller 180 divides the water drop into several water drops and disperses the droplets. After that, the display unit 151 can collect the dispersed water drops in a center to return to an original shape of the water drop 1512a.

Next, FIGS. 7A to 7G are front perspective diagrams of a mobile terminal 100 according to a fourth embodiment of the present invention. In this embodiment, the controller 180 outputs function objects 1513a and 1513b on opposite portions of the display unit 151 and outputs a moving object 1512b on a center portion thereof, such that the moving object 1512b may be moved in both directions according to an input signal described in the third embodiment.

Figure 7A:
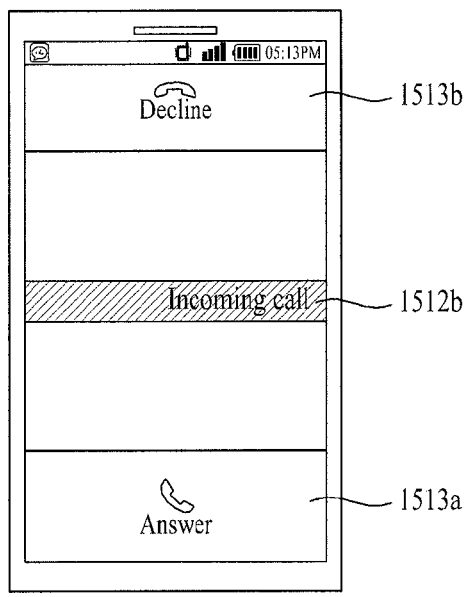
FIGS. 7A to 7G are diagrams illustrating a display screen according to a fourth embodiment for controlling a mobile terminal.

As shown in FIG. 7A, a function object 1513a corresponding to 'Answer' with respect to a call is output on a predetermined portion when a call is received and another function object 1513b corresponding to 'Decline' is output on the other opposite portion.

Figure 7B:
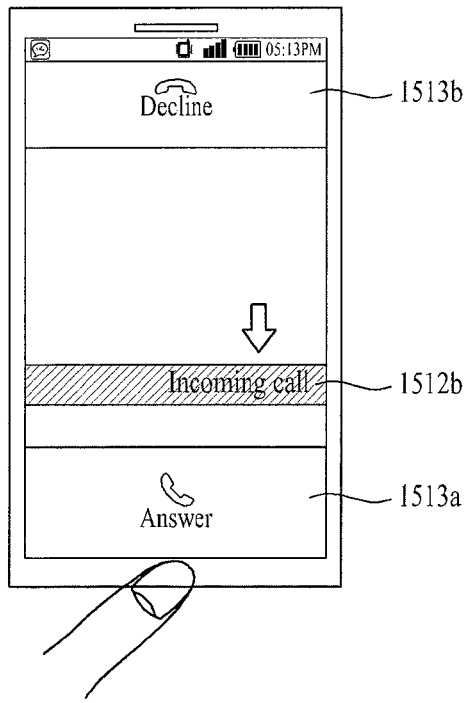
Figure 7C:
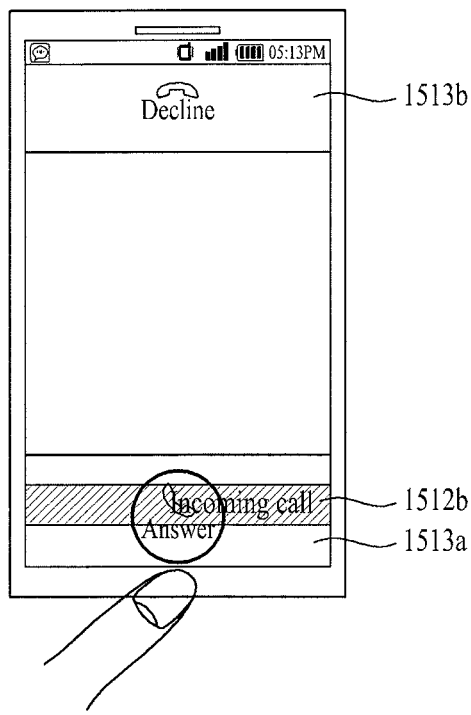
Figure 7D:
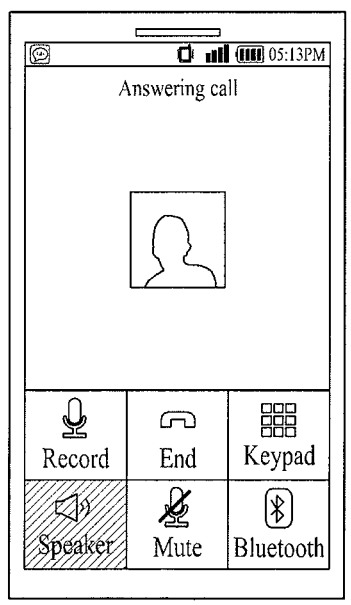

As shown in FIG. 7B, when the user presses the lower portion of the mobile terminal 100, the moving object 1512b moves toward the lower portion. When the moving object is overlapped with the function object 1513a corresponding to 'Answer', the controller 180 switches the mode into a call mode (see FIGS. 7C and 7D). Further, if the mobile terminal 100 is placed on a table, the call can be automatically placed in a speaker mode.

Figure 7E:
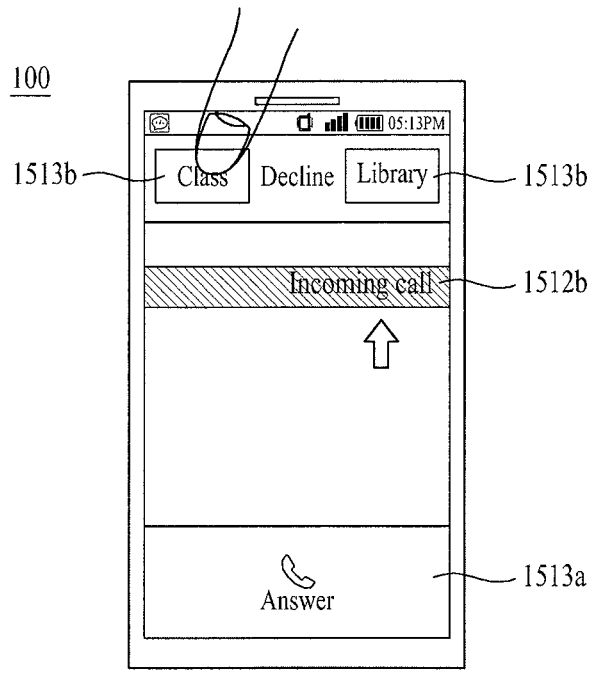
Figure 7F:
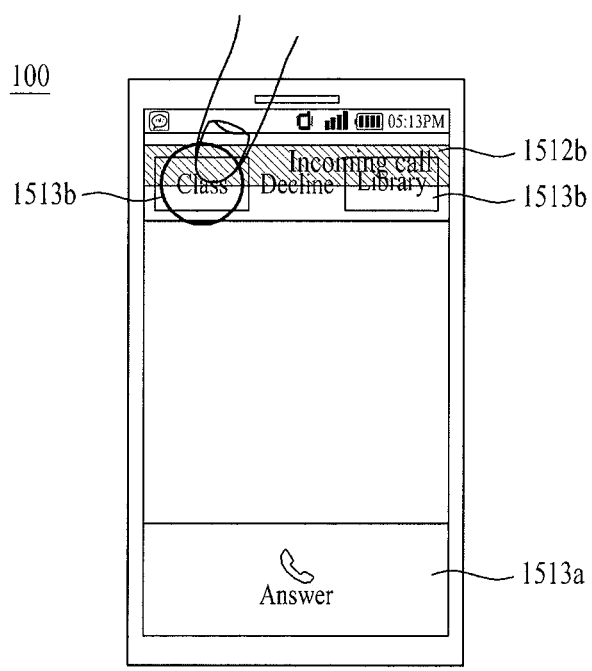
Figure 7G:
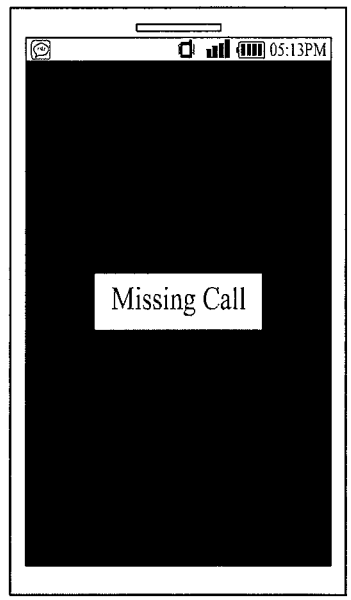

On the contrary, as shown in FIG. 7E, when the user presses the upper end portion of the mobile terminal 100, the moving object 1512b moves toward the upper end portion and when the moving object is overlapped with the function object 1513b corresponding to 'Decline' (FIG. 7F), the call is declined (FIG. 7G). At this time, two or more function objects corresponding to 'Decline' are provided as shown in FIG. 7E, and the user can decline the call and send a message instead according to a particular class (e.g., I'm in class, I'm in the library, I'm driving, I'm in movies, etc.).

The function objects 1513a and 1513b can be applied to selecting one of the two functions as well as simply receiving a call. For example, an unlocking function object and a screen-off function object are displayed on opposite portions in the third embodiment mentioned above. When the moving object is overlapped with one of the function objects, the screen can be switched into a home screen or off.

In addition, FIGS. 7E and 7F illustrate an additional embodiment in which a user can select a function object 1513b and tilt or move the terminal to decline an incoming call and automatically respond to the incoming message or call with information that they are in "class" or in the "library." For example, if the user was in class when an incoming message, call, etc. was received, the user could decline the message and have the terminal respond to the incoming message that the user can not receive the message or call because they are in "class." A similar concept applied to being in the "library."

The function objects 1513b can also be "Driving," "In the movies," "at appointment," etc. for declining an incoming call (or message, etc.). The user can also set what function objects are displayed. That is, for a student, the user may want the "Class" function object displayed because they are often in class. For a taxi driver or regular driver, the user may want the function object to be "Driving."

Figure 8A:
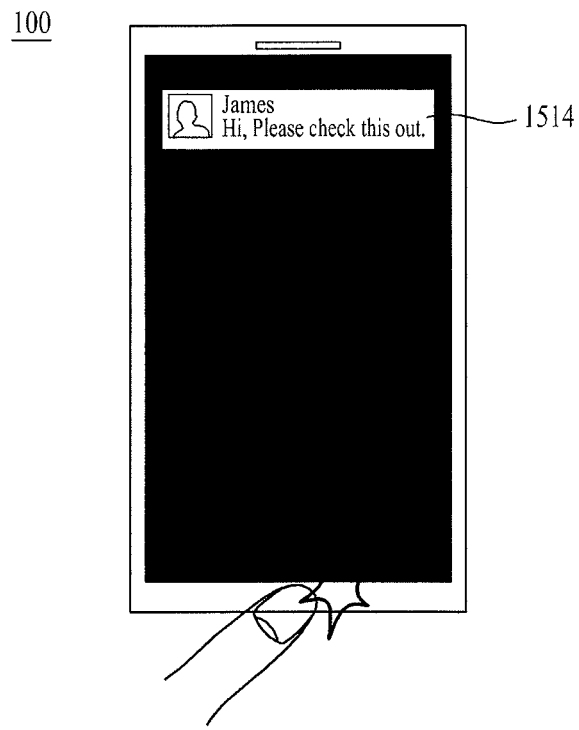
FIGS. 8A to 8E are diagrams illustrating a display screen according to a fifth embodiment for controlling a mobile terminal.

Next, FIGS. 8A to 8E are front perspective diagrams of a mobile terminal 100 according to a fifth embodiment of the present invention. When the mobile terminal 100 receives a message, a message notice window 1514 is popped upon a screen as shown in FIG. 8A.

Figure 8B:
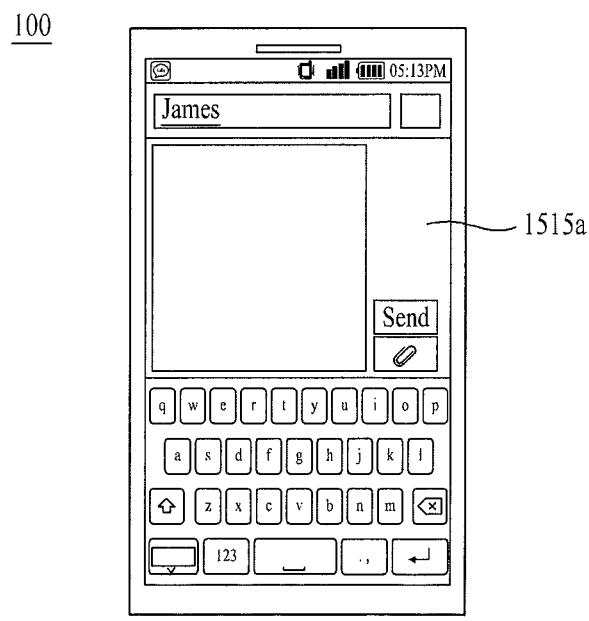
Figure 8C:
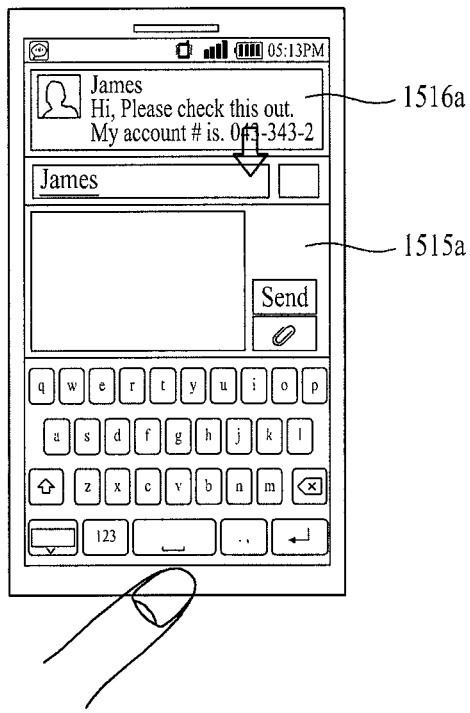
Figure 8D:
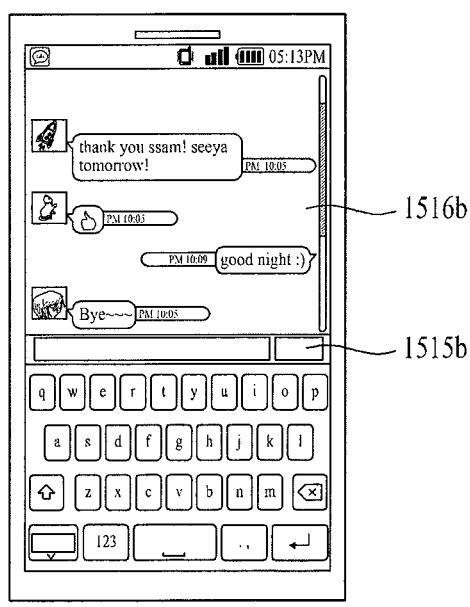
Figure 8E:
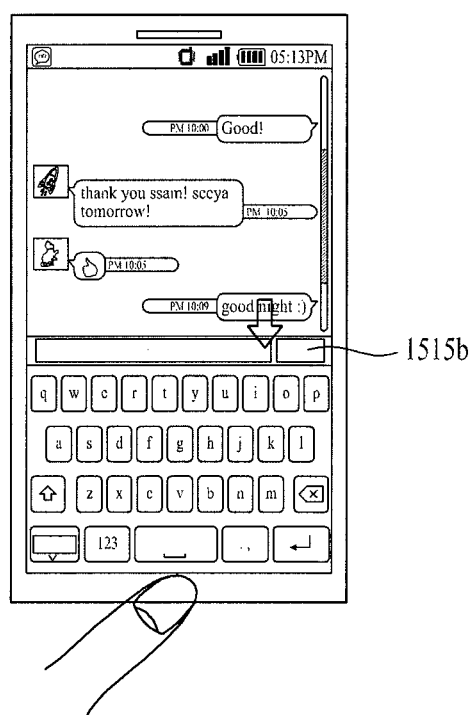

When an input signal is generated with the message notice window 1514 displayed on the screen, the message notice window 1514 is converted into a message input window 1515a and 1515b to reply to the message. In more detail, as shown in FIG. 8B, when the received message is not displayed because of a large size of the message input window 1515a, the user can press the lower end of the mobile terminal 100 and a current conversation window 1516a with the other party of the message is displayed on the other end portion as shown in FIG. 8C.

When the input signal is continuously detected for a predetermined time period or more, the current conversation window 1516a is scrolled. In addition, when no input signal is detected, the current conversation window 1516a can disappear.

Meanwhile, the received message 1516b can be checked on the same screen because the size of the message input window 1515b is small. In this instance, when an input signal is detected for a predetermined time period or more, messages of the received message window 1516b can be scrolled (see FIGS. 8D and 8E).

Figure 9A:
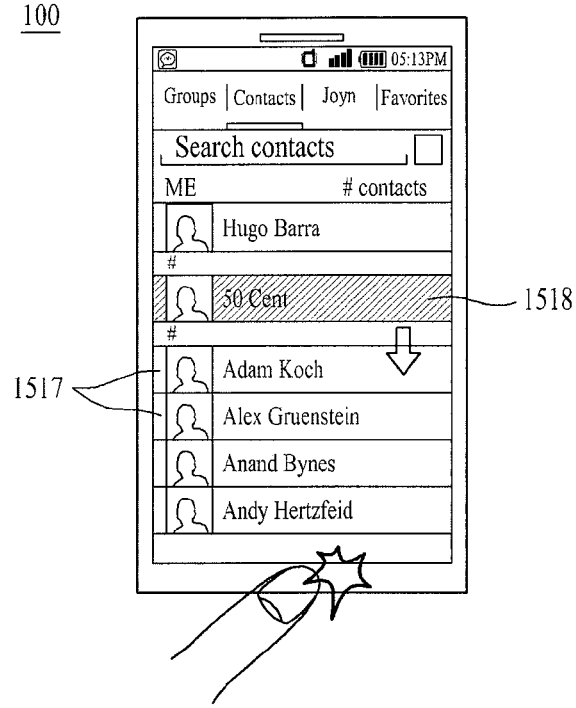
FIGS. 9A to 9C are diagrams illustrating a display screen according to a sixth embodiment for controlling a mobile terminal.
Figure 9B:
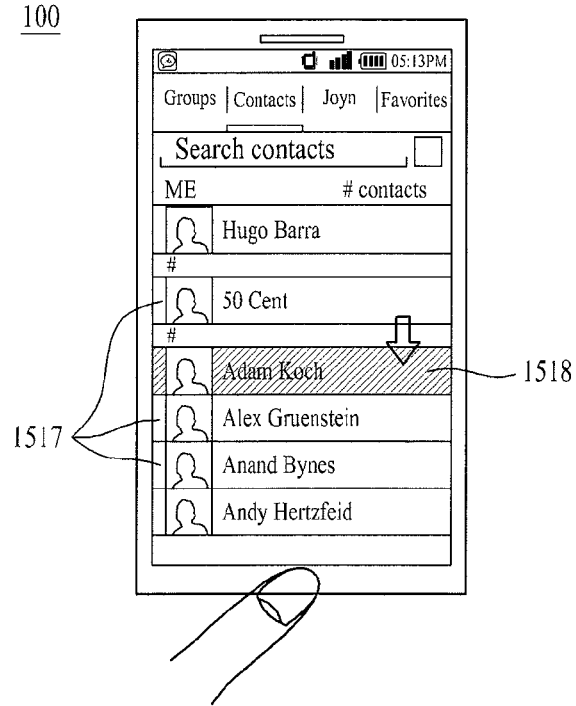
Figure 9C:
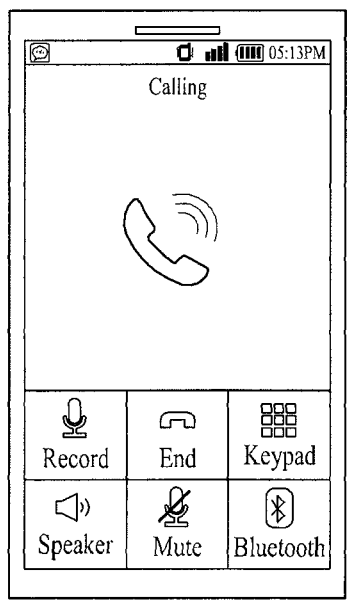

Next, FIGS. 9A to 9C are front perspective diagrams of a mobile terminal 100 according to a sixth embodiment of the present invention. In this embodiment, a list of objects or items 1517 and a focus 1518 positioned on one of the objects 1517 are displayed on the screen. The focus 1518 may be a shaded rectangular-shape moving on the screen and a color or characters of only a selected one of the listed objects 1517 can be distinctively displayed.

Once the input signal is detected, the focus 1518 is moved to an object 1517 positioned in a tilted direction. More specifically, when the user presses the lower end of the mobile terminal 100 for a short time, the focus 1518 is moved to the next object 1517. When the user presses the upper end of the mobile terminal for a shirt time, the focus 1518 is moved to the former object 1517. When the user presses either end of the mobile terminal for a longer time, an object 1517 focused using the focus 1518 may be selected.

For example, as shown in FIG. 9A, the plurality of the objects 1517 may be personal contact lists and the displayed focus 1518 is used to focus one of the objects 1517 as the mobile terminal is titled. As shown in FIG. 9A, one end portion of the mobile terminal 100 is touched. In this instance, the focus 1518 is moved to an object positioned below as shown in FIG. 9B. When the user maintains the touch, a selected contact is called (see FIG. 9C). Alternatively, the user can send a message or execute a function relating to the contact list. A similar concept applies to selecting one of the objects for setting menus, music plying lists, photograph lists and schedule lists.

Figure 10A:
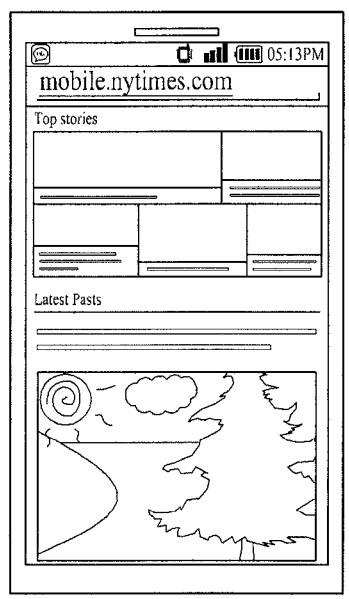
FIGS. 10A to 10C are diagrams illustrating a display screen according to a seventh embodiment for controlling a mobile terminal.
Figure 10B:
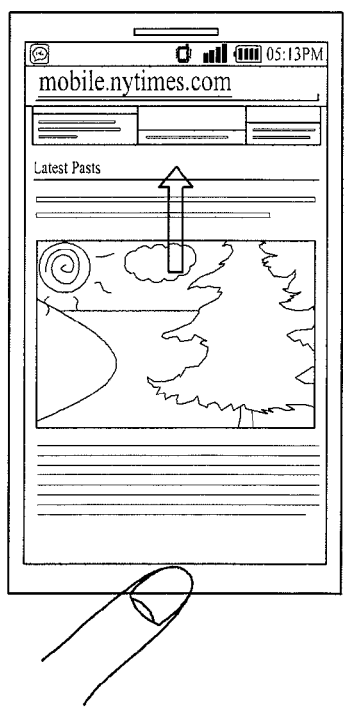
Figure 10C:
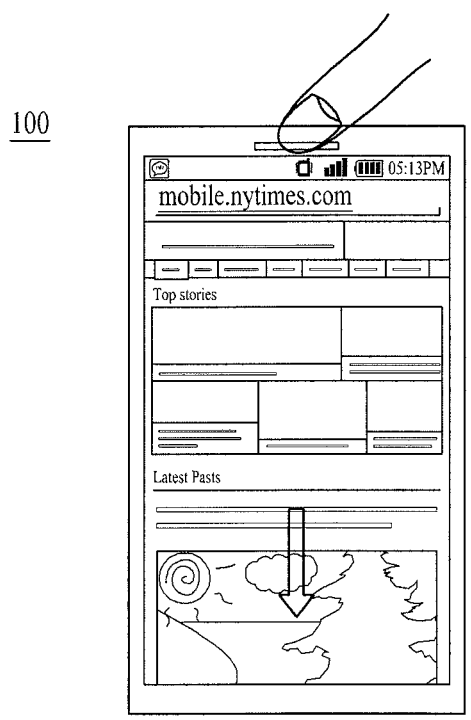

Next, FIGS. 10A to 10C are front perspective diagrams of a mobile terminal 100 according to a seventh embodiment of the present invention. In this embodiment, the display unit 151 displays a scrollable screen such as a web browser. When an input signal is detected from one portion of the mobile terminal 100 pressed by the user, the screen is moved in the reverse direction of the pressure applying and a new screen is displayed.

In more detail, as shown in FIGS. 10A and 10B, the user presses the lower end of the mobile terminal 100 for a longer time, and the display unit 151 moves or scrolls the screen in the opposite direction and displays a new screen. In contrast, as shown in FIG. 10C, the user presses the other end of the mobile terminal 100, the display unit 151 scrolls the screen in the other opposite direction.

Further, the scrolling speed may be adjustable according to the tilting of the mobile terminal 100. Also, while the user presses the lower or upper end of the mobile terminal 100 for a longer time, the screen moving can be implemented continuously. Optionally, when the user presses the lower or upper end of the mobile terminal 100 for a shorter time, page-up and page-down can be implemented in a predetermined unit.

Meanwhile, when an input signal is generated after the user presses one end, a current page is moved to the next page. When an input signal is generated after the user presses the other end, the current page is moved to the received page. Also, when a scrollable web browser is output based on the user presses the lower or upper end for a longer time, like this embodiment, the short touch of the lower end can be input to move to a web site opened before and a short touch to the upper end can be input to return to the opened web site.

Figure 11A:
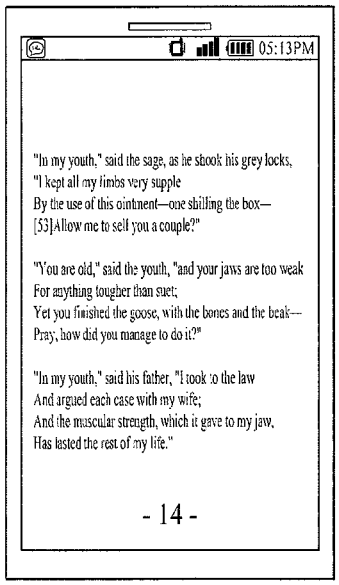
FIGS. 11A to 11C are diagrams illustrating a display screen according to an eighth embodiment for controlling a mobile terminal.
Figure 11B:
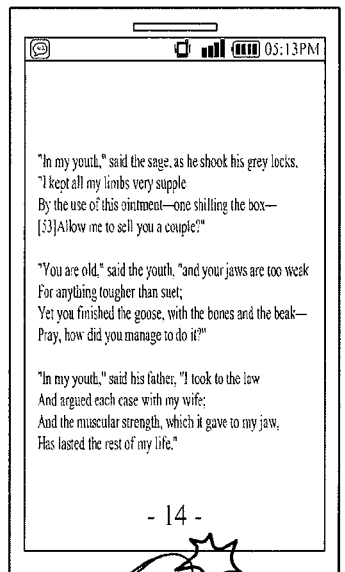
Figure 11B:
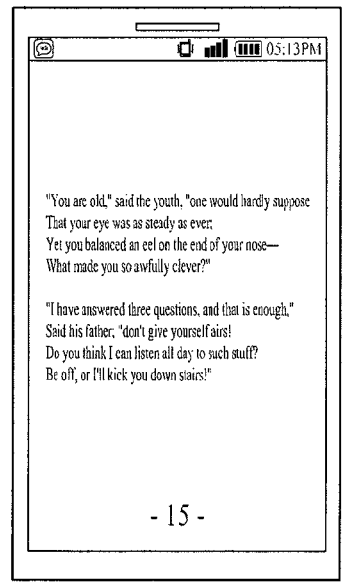
Figure 11C:
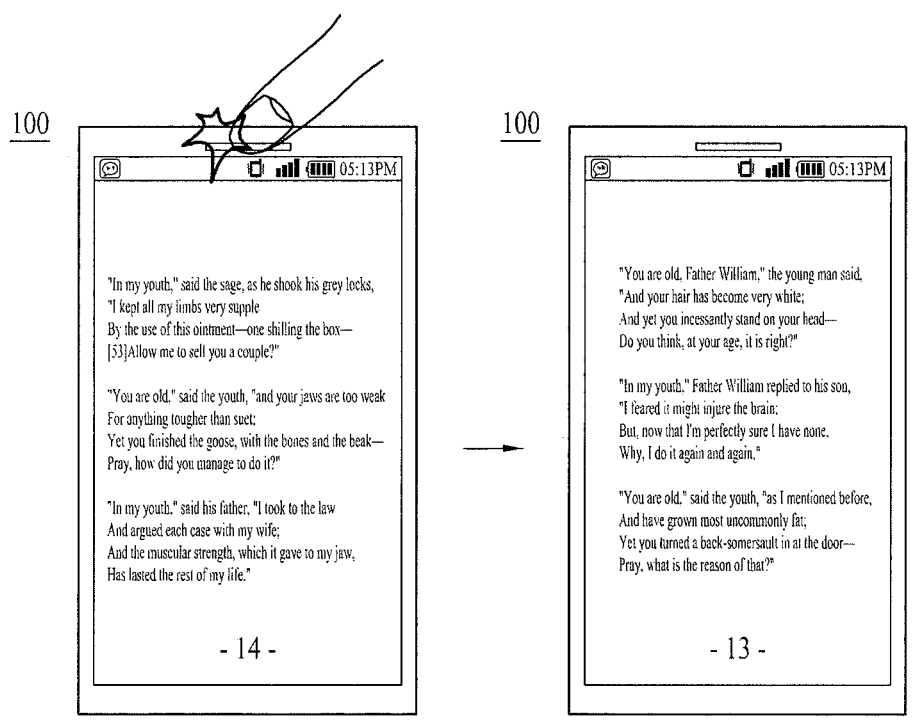

Next, FIGS. 11A to 11C are front perspective diagrams of a mobile terminal 100 according to an eighth embodiment of the present invention. In this example, the display unit 151 is configured to display a plurality of pages such as an e-book. The user can then press the mobile terminal 100 to generate an input signal according to the tilting of the mobile terminal 100 that can match a command for moving a current page to the former or next page of the e-book.

In more detail, as shown in FIGS. 11A and 11B, an input signal generated when the user presses one end of the mobile terminal 100 and the current page moves to the next page. As shown in FIG. 11C, an input signal is generated when the user presses the other opposite end of the mobile terminal 100, the current page moves to the previous page.

In addition, the above description refers to the lower end and the upper end of the mobile terminal 100. Further, the user can press the lower or upper ends for a short time or a longer time. Thus, four separate input signals can be generated (two input signals by pressing the lower end for a short time or a longer time, and two input signals by pressing the upper end for a short time or a longer time). Further, the above description described particular functions executed or performed when the user presses one of the end portions for a short time or long time.

However, the present invention also allows the user to set how the four different input signals are used by setting an appropriate user menu. For example, the user may set the first signal in FIG. 2B (pressing the lower end of the mobile terminal 100) to move item by item in a list. Alternatively, the user may set the first signal to move items page by page. That is, the first, second, third and fourth signal shown in FIGS. 2B-2D can be intermixed and set by the user.

As described above, according to at least one embodiment of the present invention, the mobile terminal 100 includes the curved surface and the user can tilt the mobile terminal to control the mobile terminal in various ways.

Furthermore, the number of the buttons can be reduced because the input signal can be generated by the tilting variation of the mobile terminal 100. Change of the screen output on the display unit 150 according to the tilting of the mobile terminal is also intuitive. Accordingly, the user can control the mobile terminal easily.

Various variations and modifications are possible in the component parts and/or arrangements of the subject combination arrangement within the scope of the disclosure, the drawings and the appended claims.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A mobile terminal comprising:
   a case having a curved back side between a first end portion and a second end portion such that when the mobile terminal is placed on a flat surface, a portion of the curved back side touches the flat surface and the first and second end portions are raised above the flat surface;
   a display unit arranged on a front side of the case, the display unit having a first end and a second end;
   a sensor configured to detect a moving or tilting of the mobile terminal; and
   a controller configured to perform a designated function in accordance with the moving or tilting of the mobile terminal,
   wherein when the moving or tilting of the mobile terminal is detected while the display unit is in a screen-off state, the controller is further configured to display a specific information corresponding to the specific function on the display unit, and
   wherein when the sensor detects a moving or tilting direction corresponds to the first end portion being lower than the second end portion, the controller is further configured to display the specific information appearing at the second end of the display unit and moving across the display unit towards the first end of the display unit.

2. The mobile terminal according to claim 1, wherein the controller is further configured to stop displaying the specific information displaying screen when the moving or titling of the mobile terminal is stopped.

3. The mobile terminal according to claim 1, further comprising:
   a plurality of input keys arranged on a predetermined portion of the display unit,
   wherein when at least one input key assigned a specific function is selected together with the moving or tilting, the controller is further configured to display a specific information displaying screen corresponding to the specific function on the display unit.

4. The mobile terminal according to claim 3, wherein the selected input key is one of a button independent from the display unit or a touch icon on the display unit.

5. The mobile terminal according to claim 1, wherein the controller is further configured to display a moving object on the display unit, and move the moving object on the display unit in accordance with a moving or tilting direction of the mobile terminal.

6. The mobile terminal according to claim 5, wherein a moving speed of the moving object is relatively fast when the moving or tilting direction of the mobile terminal is a first angle, and relatively slow when the moving or tilting direction of the mobile terminal is second angle less than the first angle.

7. The mobile terminal according to claim 5, wherein the controller is further configured to display the moving object as shaking on the display unit, when the moving or tilting direction of the mobile terminal indicates the mobile terminal is being shaken.

8. The mobile terminal according to claim 5, wherein the controller is further configured to:
   display function objects on at least one end of the display unit, and
   when the moving object is overlapped with one of the function objects, execute a function designated by the overlapped function object.

9. The mobile terminal according to claim 1, wherein the controller is further configured to:
   display a notification window on the display unit notifying an event has been generated on the mobile terminal,
   receive an action indicating the mobile terminal is being moved or tilted, and display a window for responding to the notification window when the action indicating the mobile terminal is being moved or tilted is received.

10. The mobile terminal according to claim 1, wherein the controller is further configured to:
   display a list of items on the display unit,
   display a focus on one item of the list of the items, and
   move the focus on the display unit to an object positioned in a moving or tilting direction of the mobile terminal.

11. The mobile terminal according to claim 10, wherein the controller is further configured to select the object having the focus positioned thereon, when the moving or titling of the mobile terminal maintains the focus on the selected item for longer than a predetermined time.

12. The mobile terminal according to claim 1, wherein when the display unit displays a first screen scrollable with respect to one direction, the controller is further configured to scroll the first screen in the other opposite direction based on the moving or titling of the mobile terminal.

13. The mobile terminal according to claim 1, wherein when the display unit outputs a screen including a plurality of pages, the controller is further configured to page through the plurality of pages in a forward direction based on the moving or titling of the mobile terminal being performed at the first end portion and page through the plurality of pages in a reverse direction based on the moving or titling of the mobile terminal being performed at the second end portion.

14. The mobile terminal according to claim 1, wherein the controller is further configured to display a screen for unlocking the mobile terminal when multi-touching of the display unit and the moving or titling of the mobile terminal are simultaneously detected.

15. The mobile terminal according to claim 1, wherein the moving or titling of the mobile terminal comprises at least one of:
   a first moving or titling of the first end portion for a time less than or equal to a predetermined reference time such that the first end portion is moved or tilted downward;
   a second moving or titling of the first end portion for a time greater than the predetermined reference time such that the first end portion is moved or tilted further downward;
   a third moving or titling of the second end portion for the time less than or equal to the predetermined reference time such that the second end portion is moved or tilted downward; and
   a fourth moving or titling of the second end portion for the time greater than the predetermined reference time such that the second end portion is moved or tilted further downward.

16. The mobile terminal of claim 1, wherein the moving or tilting of the mobile terminal is caused by a touching or tapping of the case.

17. The mobile terminal of claim 1, wherein the display unit has a curved front surface.

18. A method of controlling a mobile terminal, the method comprising:
   detecting, via a sensor, a moving or tilting of the mobile terminal, said mobile terminal including a case having a curved back side between a first end portion and a second end portion such that when the mobile terminal is placed on a flat surface, a portion of the curved back side touches the flat surface and the first and second end portions are raised above the flat surface, and a display unit arranged on a front side of the case, the display unit having a first end and a second end; and
   performing, via a controller, a designated function in accordance with the moving or tilting of the mobile terminal,
   wherein when the moving or tilting of the mobile terminal is detected while the display unit is in a screen-off state, the controller is further configured to display a specific information corresponding to the specific function on the display unit, and
   wherein when the sensor detects a moving or tilting direction corresponds to the first end portion being lower than the second end portion, the controller is further configured to display the specific information appearing at the second end of the display unit and moving across the display unit towards the first end of the display unit.

19. A mobile terminal comprising:
   a case having a curved back side between first and second end portions such that when the mobile terminal is placed on a flat surface, a portion of the curved back side touches the flat surface and the first and second end portions are raised above the flat surface;
   a display unit arranged on a front side of the case;
   a sensor configured to detect a moving or tilting of the mobile terminal;
   a controller configured to perform a designated function in accordance with the moving or tilting of the mobile terminal; and
   a plurality of input keys arranged on a predetermined portion of the display unit, and
   wherein when at least one input key assigned a specific function is selected together with the moving or titling, the controller is further configured to display a specific information displaying screen corresponding to the specific function on the display unit.

* * * * *